R. MASON.
ASH SIFTER.
APPLICATION FILED JULY 29, 1920.

1,356,385.

Patented Oct. 19, 1920.

WITNESSES
Oliver W. Holmes
S. W. Foster

INVENTOR
RICHARD MASON
BY
ATTORNEYS

UNITED STATES PATENT OFFICE.

RICHARD MASON, OF SARATOGA SPRINGS, NEW YORK.

ASH-SIFTER.

1,356,385.　　　　　Specification of Letters Patent.　　Patented Oct. 19, 1920.

Application filed July 29, 1920.　Serial No. 399,652.

*To all whom it may concern:*

Be it known that I, RICHARD MASON, a citizen of the United States, and a resident of Saratoga Springs, in the county of Saratoga and State of New York, have invented a new and Improved Ash-Sifter, of which the following is a full, clear, and exact description.

This invention relates to improvements in ash sifters, an object of the invention being to provide a manually operated ash sifter which facilitates the sifting of the ashes and the ready discharge of the cinders and the sifted ash.

A further object is to provide an ash sifter which will be practically dustless, which will be convenient to operate, which can be manufactured and sold at a reasonably low price, and which will facilitate the sifting of ashes and hence result in an economy of fuel.

With these and other objects in view the invention consists in certain novel features of construction, and combinations and arrangements of parts, as will be more fully hereinafter described and pointed out in the claims.

In the accompanying drawings—

Figure 1:
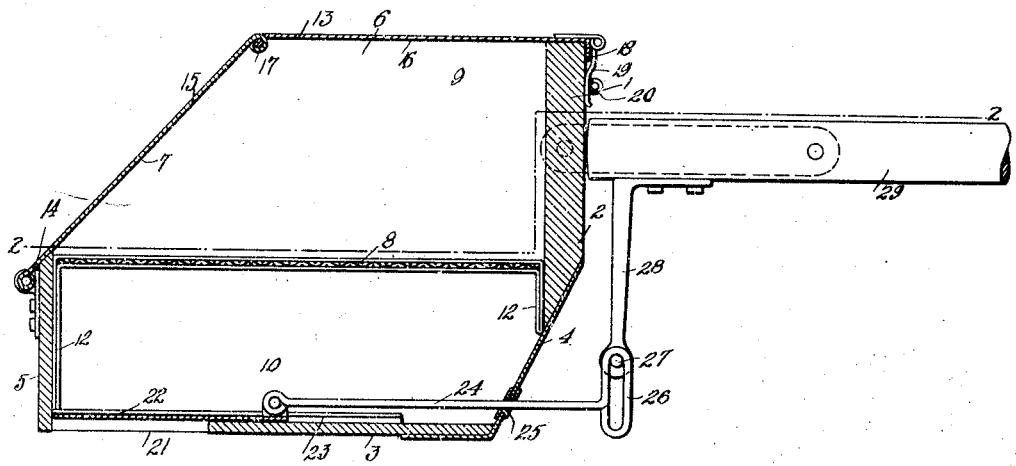
Figure 1 is a view in longitudinal vertical section illustrating my improved sifter.
Figure 2:
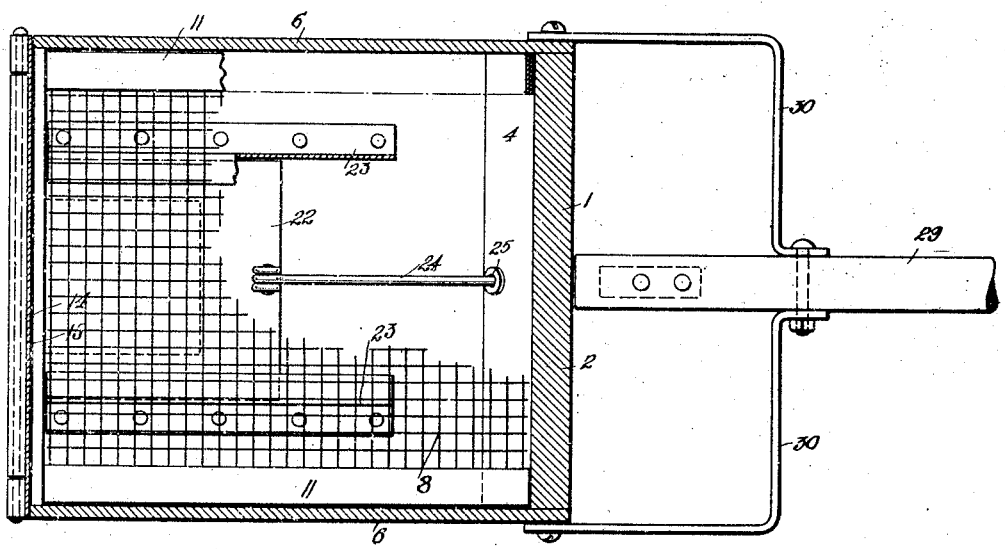
Fig. 2 is a view in horizontal longitudinal section on the staggered line 2—2 of Fig. 1, the portions being broken away and in section to illustrate the parts below.

1 represents a box-like casing which is preferably of wood, although it may be of other suitable material. The rear end 2 of the casing terminates above the bottom 3 and is connected preferably by an inclined metal plate 4. The front wall 5 of the casing extends from the bottom of the casing upwardly a relatively short distance and the sides 6, 6, of the casing have tapered or inclined forward edges 7 as clearly shown in Fig. 1 and for a purpose which will hereinafter appear.

A screen 8 is mounted in the casing 1 dividing the latter into an upper compartment 9 and a lower compartment 10. This screen 8 is preferably of wire mesh of any desired gage and is provided at its side edges with strengthening pins 11 which may be secured to the wire mesh screen 8 and which are provided at their ends with downwardly projecting feet 12, the front feet 12 engaging the bottom 3 and the rear feet 12 engaging the inclined plate 4 holding the screen in horizontal position but permitting its removal at any time desired.

A two-part cover 13 is hingedly connected to the front wall 5 as shown at 14, and the two members 15 and 16 of said cover are hingedly connected as shown at 17. One member 15 of the cover is adapted to raise the inclined forward edges 7 of the casing 1 and the other member 16 of the cover extends across the top of the casing and has a flange 18 fitting over the upper edge of the casing. This cover may be locked in closed position in any approved manner.

I have illustrated as a securing means a clasp 19 on the cover fitting over a staple 20 and it is obvious that any form of securing means may be provided in the staple or any other form of securing device may be employed to hold the cover in closed position.

The bottom 3 is provided at its forward end with an outlet 21 normally closed by a sliding gate 22, the latter mounted in guide bars 23 fixed to the bottom 3. A link 24 is connected to the gate 22 and extends through an opening 25 in the inclined plate 4. This link 24 is provided at its rear or outer end with a vertically positioned elongated loop 26 receiving a pin 27 on an arm 28 secured to a handle 29. The handle 29 is pivotally connected to the casing 1 by angle brackets 30, but the extreme inner end of the handle normally bears against the rear wall 2 of the casing holding the parts in operative position.

In operation, the member 16 of the cover 13 is thrown open and the unsifted ashes are deposited in the chamber or compartment 9 and said cover section is then closed and locked in closed position. The operator then manually shakes the sifter by means of the handle 29 so that the fine ash will fall through the screen 8 into the compartment or chamber 10 below.

To remove this sifted ash, it is simply necessary for the operator to elevate the free end of the handle 29 relative to the casing and this movement of the handle will, through the medium of the arm 28 and the link 24, draw the gate 22 to open position and allow the ash to escape. It is necessary in most instances during this opening of the gate to rest the forward end of the casing against some fixed support, but the gate may be opened by a quick shifting of the handle and closed in like manner.

To remove the cinders above the screen, the cover as a whole is swung on the hinge 14 when the cinders can be directed off the end of the screen and through the open ends of the casing.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A sifter, comprising a casing, a screen in the casing, a handle movably connected to the casing, an arm on the handle, said casing having an outlet in its bottom, a gate controlling the outlet, and means operatively connecting the gate and the arm whereby the pivotal movement of the handle relative to the casing controls the operation of the gate.

2. An ash sifter, comprising a casing, a sifting screen in the casing dividing the same into upper and lower compartments, a handle pivotally connected to the casing, an arm on the handle, said casing having an ash outlet in its bottom, a gate closing said outlet, and a link connecting the gate and the arm whereby the movement of the handle relative to the casing causes the opening and closing of the gate.

3. An ash sifter, comprising a casing, a sifting screen in the casing dividing the same into upper and lower compartments, a cover for the upper compartment, means for securing the cover in closed position, a handle pivotally connected to the casing, said casing having an outlet in its bottom, guide bars fixed to the floor of the casing, and a gate slidable in said bars normally closing said outlet and controlled by the position of the handle relative to the casing.

RICHARD MASON.